United States Patent [19]

Armer

[11] Patent Number: 4,523,292
[45] Date of Patent: Jun. 11, 1985

[54] COMPLEMENTARY FET RIPPLE CARRY BINARY ADDER CIRCUIT

[75] Inventor: John Armer, Middlesex, N.J.

[73] Assignee: RCA Corporation, Princeton, N.J.

[21] Appl. No.: 429,328

[22] Filed: Sep. 30, 1982

[51] Int. Cl.$^3$ .............................................. G06F 7/50
[52] U.S. Cl. ..................................................... 364/786
[58] Field of Search ........................................ 364/786

[56] References Cited

U.S. PATENT DOCUMENTS

| | | | |
|---|---|---|---|
| 3,900,742 | 8/1975 | Hampel et al. | 307/211 |
| 3,949,242 | 4/1976 | Hirasawa et al. | 307/205 |
| 4,152,775 | 5/1979 | Schwartz | 364/786 |
| 4,217,502 | 8/1980 | Suzuki et al. | 307/205 |
| 4,255,723 | 3/1981 | Ebihara | 331/116 |
| 4,323,982 | 4/1982 | Eichrodt et al. | 364/786 |
| 4,357,675 | 8/1982 | Freyman | 364/786 |
| 4,417,316 | 11/1983 | Best | 364/770 |
| 4,425,623 | 1/1984 | Russell | 364/786 |
| 4,439,835 | 3/1984 | Best et al. | 364/786 |
| 4,471,454 | 9/1984 | Dearden et al. | 364/786 |

FOREIGN PATENT DOCUMENTS 077912  5/1983  European Pat. Off. .

OTHER PUBLICATIONS

T. Kilburn et al., "Parallel Addition in Digital Computers: A New Fast Carry Circuit," IEE Proc., vol. 106, Pt. B, pp. 464–466, 1959.
T. Kilburn et al., "Parallel Arithmetic Unit Using Saturated-Transistor Fast-Carry Circuit," IEE Proc., Pt. B, vol. 107, Nov. 1960, pp. 573–584.

*Primary Examiner*—David H. Malzahn
*Attorney, Agent, or Firm*—E. M. Whitacre; P. J. Rasmussen; E. P. Herrmann

[57] ABSTRACT

A binary ADDER stage for producing SUM and Carry signals is constructed with five transistors, an exclusive OR gate and an exclusive NOR gate. The two digits to be added are applied to the exclusive OR gate, the output of which is connected to one input of the exclusive NOR gate and to the gate electrode of a first N-type transistor. The second input of the exclusive NOR gate is connected to a carry input terminal, and the output of the exclusive NOR provides the sum of the two digits plus the carry. The conduction path of the first N-type transistor is connected between the carry input and carry output terminals and is conditioned to conduct when the input digits differ. Second and third N-type transistors are serially connected between the carry out terminal and ground reference and have respective gate electrodes connected to the two digit input terminals respectively, for clamping the carry out terminal to a logic 0 whenever both input digits are logical 1's. Fourth and fifth P-type transistors are serially connected between the carryout terminal and positive supply potential and have respective gate electrodes connected to the two digit input terminals, respectively, for clamping the carry output terminal to a logic 1 whenever both input digits are logical 0's.

1 Claim, 4 Drawing Figures

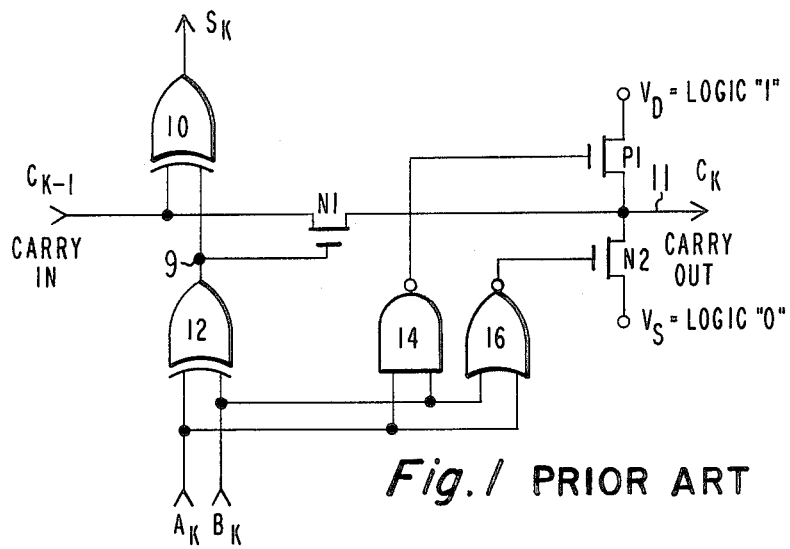
*Fig. 1* PRIOR ART
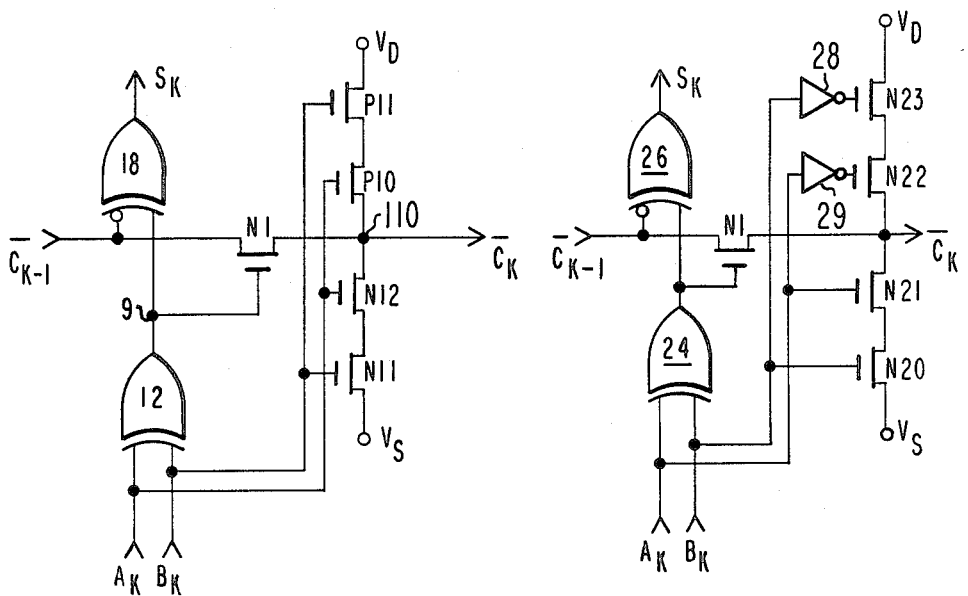
*Fig. 2*  *Fig. 3A*
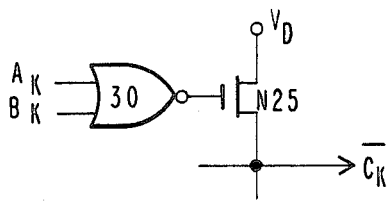
*Fig. 3B*

COMPLEMENTARY FET RIPPLE CARRY BINARY ADDER CIRCUIT

BACKGROUND OF THE INVENTION

The present invention relates to digital ADDER circuitry and more particularly to an improvement in the "Manchester Carry Chain."

In the addition of any two numbers, A and B the sum $S_k$ of the $k^{th}$ significant digit is dependent upon the value of the $k_{th}$ digits $A_k$ and $B_k$ and also upon the "carry" from the $(k-1)$th digit. Nominally when adding two N digit numbers time must be provided for the "carry" indication to propagate from the least significant bit position to the most significant bit position. Because the numbers used in performing digital addition electronically have only two values, "1" or "0", the propagation time of the "carry" indication can be foreshortened by using what has become known as the "Manchester Carry Chain." This circuitry is described in the article "Parallel Addition In Digital Computers: A New Fast Carry Circuit" described by T. Kilburn et al, Proc. IEE, Vol. 106, Pt.B, at pages 464–466. Foreshortening the "carry" propagation time decreases the total time required to add the two N digit numbers.

The basic "Manchester Carry Chain" comprises $N-1$ cascaded groups of switches for an N bit ADDER, and logic circuitry responsive to the N addend digits to control the switches. Each group of switches includes a series switch connected between the "carry" output of the next most least significant bit (digit) position and the "carry" input of the next most more significant bit position. In addition, a second switch is connected between the "carry" output of the immediate bit position and the logical "1" supply potential and a third switch is connected between the "carry" output of the immediate bit position and the logical "0" supply potential. Depending on whether the input values for the particular bit position are 11 or 00, the second or third switches will be closed respectively. On the other hand, if the bit values are 01 or 10 the series switch will be closed to propagate the "carry" signal from the next most least significant bit position.

A little reflection will convince the reader that if the kth digits $A_k$ and $B_k$ are both "0" or both "1" the kth carryout will be "0" and "1" respectively, regardless of the $(k-1)$th carryout. On the other hand, if the $A_k$ and $B_k$ values are 10 or 01 the kth carry output will be equal to the $(k-1)$th carry output which in the Manchester arrangement is passed by the series switch. The carry switching control logic will respond to the addends faster than the summing logic, thus the carry indication is made available to the more significant ADDER digit position in much less time than if it were necessary to complete the sum and carry of each least significant bit position before adding the values of the next bit position.

Typically, ADDER circuits are constructed in integrated circuit form, in which case the switches of a Manchester carry chain are realized with the principal conduction paths of transistors. The switch control circuits are designed with combinatorial logic gates, e.g., an AND gate and a NOR gate each responsive to the $A_k$ and $B_k$ values for controlling the second and third switches, respectively. The series switch is nominally controlled by the output of a half adder responsive to the $A_k$ and $B_k$ values.

SUMMARY OF THE INVENTION

The present invention is a circuit simplification of the second and third switch configuration and the control logic therefore in a Manchester carry chain. The CMOS realization of the simplified circuit comprises first and second P-type field effect transistors (FET's) having their drain-source conduction paths serially connected between a relatively positive supply potential and the bit carryout bus. Third and fourth N-type FET's have their drain-source conduction paths serially connected between the bit carryout bus and relatively negative supply potential. The control electrodes of the first and third FET's are connected for applying one of the addend bits ($A_k$) thereto and the control electrodes of the second and fourth transistors are connected for applying the augend bit ($B_k$). This arrangement replaces a NAND gate and a NOR gate with one P and one N-type transistor effecting a savings in parts, power dissipation and signal propagation time.

BRIEF DESCRIPTION OF THE DRAWINGS

FIG. 1 is a schematic diagram of one full ADDER stage employing a "Manchester Carry Chain";

FIG. 2 is a schematic diagram of a CMOS full ADDER stage embodying the present invention; and FIG. 3A is a schematic diagram of a full ADDER stage realized with a single conductivity transistor process, e.g., NFET's, and embodying the present invention and FIG. 3B is a schematic diagram of circuitry which may be substituted in the FIG. 3A circuit.

DETAILED DESCRIPTION OF THE INVENTION

Referring to FIG. 1, exclusive OR (XOR) gate 12 has first and second input connections arranged for application of the kth significant digit of a binary addend A and the kth significant digit of a binary augend B. The output connection 9 of XOR 12 is the sum $0_k$ of $A_k$ and $B_k$ and is represented by the Boolean equation $0_k = A_k \oplus B_k$ where the symbol $\oplus$ represents the conventional exclusive OR operation. XOR 12 is generally known as a half adder. A second XOR gate 10 has first and second input connections to connection 9 and the "carry" bit $C_{k-1}$ from ADDER circuitry operating on the next most least significant digits of the addend A and augend B. The output $S_k$ of XOR gate 10 is given by the Boolean equation:

$$S_k = C_{k-1} \oplus 0_k = C_{k-1} \oplus (A_k \oplus B_k) \quad (1)$$

XOR 10 operates a second half ADDER and the cascaded combination of XOR 10 and XOR 12 forms a full ADDER for the digits $A_k$, $B_k$ and the carry bit $C_{k-1}$. The signal $S_k$ represented by equation (1) comports with the definition of binary addition.

A complete full ADDER must provide a carryout signal $C_k$ and this function is provided by the remainder of the FIG. 1 circuitry. It will be recognized that if $A_k$ and $B_k$ are both logical "1's", regardless of the value of the $C_{k-1}$ carry signal, the $C_k$ carry must be a logical "1". Conversely, if both $A_k$ and $B_k$ are logical "0's", the $C_k$ carry must be a logical zero. On the other hand, if the states of $A_k$ and $B_k$ are either 01 or 10, then the carry bit $C_k$ will be dependent on the logical value of $C_{k-1}$, i.e., if $C_{k-1}$ is a "1" or "0", the $C_k$ value will be "1" or "0", respectively. Therefore if the states of $A_k$ and $B_k$ are 01 or 10, the carry $C_k$ will be the same as the carry $C_{k-1}$.

Consider connection 11, the $C_k$ carryout terminal, to be connected via three switches N1, N2 and P1 to the $C_{k-1}$ logic signal, a logic "0" signal and a logic "1" signal. By closing any one of the switches to the exclusion of the others a $C_{k-1}$, logic "1" or logic "0" carry value can be produced at the $C_k$ carry terminal 11.

Switches N1 and N2 are closed when a logic "1" is applied to their respective control electrodes. Switch P1 is closed when a logic "0" is applied to its control electrode. The control electrode of switch N1 is responsive to the output state of XOR 12. A logic NAND gate, having first and second input terminals connected for applying digits $A_k$ and $B_k$, controls the control electrode of switch P1. A logic NOR gate, having first and second input terminals connected for applying $A_k$ and $B_k$, controls the control electrode of switch N2. Reference to Table 1 below will show that the switches N1, N2 and P1 are indeed closed to the exclusion of the others and that $C_{k-1}$, logic "1" or logic "0" is applied to terminal 11 in accordance with the value of the addend and augend bits $A_k$ and $B_k$.

TABLE 1

| | | | ($C_k$, XOR10 vs $A_k$, $B_k$, $C_{k-1}$) | | | | |
|---|---|---|---|---|---|---|---|
| $A_k$ | $B_k$ | $C_{k-1}$ | XOR12 | NAND14 | NOR16 | XOR10 | $C_k$ |
| 0 | 0 | 0 | 0 | 1 | 1 | 0 | 0 |
| 0 | 0 | 1 | 0 | 1 | 1 | 1 | 0 |
| 0 | 1 | 0 | 1 | 1 | 0 | 1 | 0 |
| 0 | 1 | 1 | 1 | 1 | 0 | 0 | 1 |
| 1 | 0 | 0 | 1 | 1 | 0 | 1 | 0 |
| 1 | 0 | 1 | 1 | 1 | 0 | 0 | 1 |
| 1 | 1 | 0 | 0 | 0 | 0 | 0 | 1 |
| 1 | 1 | 1 | 0 | 0 | 0 | 1 | 1 |

FIG. 2 illustrates an improvement over the FIG. 1 circuit with regard to circuit simplicity and speed. Elements of the FIG. 2 circuit designated with like numerals or elements in the FIG. 1 circuit are similar and operate in similar fashion. The FIG. 2 circuit generates a Carry signal $\overline{C}_k$ which is complementary to the carry signal $C_k$ generated by the FIG. 1 circuit for like values of $A_k$ and $B_k$. This imposes the constraint that the second half ADDER 18 be an exclusive NOR (XNOR) gate. Those skilled in the art of digital circuit design will readily appreciate that the output $S_{k18}$ of XNOR 18 will be $$S_{k18} = (A_k \oplus B_k) \oplus C_{k-1} \qquad (2)$$

and equal to the sum signal represented in equation (1). The reason for this is that the XNOR operating on the complemented Carry $\overline{C}_{k-1}$ compensates for the signal inversion.

Use of an exclusive NOR need add no complexity to the circuitry as the XNOR and XOR gates can be designed with the same number of transistors (see for example, the data sheets on the RCA Corporation CD4070 XOR integrated circuit and the CD4077 XNOR integrated circuit published in the RCA Solid State COS/MOS Integrated Circuit SSD250B Data Book, September 1980).

N-type transistor N1 operates as a series switch responsive to the output of XOR12 switch as in FIG. 1 to pass the carry signal $\overline{C}_{k-1}$ when the input digits $A_k$ and $B_k$ are either 01 or 10. The serially connected P-type transistors P11 and P10, responsive to the digit input values $B_k$ and $A_k$ respectively, located between the positive supply terminal $V_D$ and the carry out terminal 110, operate as a second switch for applying a logic "1" to terminal 110 on the condition that $B_k$ and $A_k$ are both logical "0's". The second switch P1 in FIG. 1, on the other hand, applied a logical 1 to the carry out terminal 11 on the condition that both $B_k$ and $A_k$ are both logical "1's". The reason for the inversion of the carry out signal between the FIG. 1 and FIG. 2 circuits is the interposition of the inverting control NAND gate 14 between the signal inputs $A_k$ and $B_k$ and the switch control electrode.

Serially connected N-type transistors N11 and N12 located between the relatively negative supply potential $V_S$ and the carry out terminal 110 and responsive to digit input signals $B_k$ and $A_k$, respectively, function as a third switch for applying a logic "0" to terminal 110 only on the condition that the input digits $A_k$ and $B_k$ are both logical "1's". Note that the third switch N2 in FIG. 1 applied a logic "0" to the carry out terminal 11 on the condition that both $A_k$ and $B_k$ are logical "0's" due to the inverting response of NOR gate 16 interposed between the digit input terminals and the switch control electrode. The absence of the inverting decoding gates 14 and 16 in the FIG. 2 circuit result in the FIG. 2 circuit generating complementary "carry" signals with respect to the "carry" signals generated by the FIG. 1 circuit for similar digit input values $A_k$ and $B_k$.

N-type transistor N11 and P-type transistor P11, both having their control electrodes connected to input connection $B_k$, being complementary type devices each conduct to the exclusion of the other. That is, if the value of $B_k$ is a logic "1", N11 will conduct while P11 will be cut off, and if $B_k$ is a logic "0", P11 will conduct while N11 is cut off. Similarly, complementary transistors P10 and N12, both responsive to the value of input $A_k$ each conduct to the exclusion of the other. Thus, it can be seen that the first (N1), second (P10,P11) and third (N11,N12) switches each conduct to the exclusion of the other two. Table 2 illustrates the input and output states of the FIG. 2 circuit.

TABLE 2

| | | | ($\overline{C}_k$, XNOR18 vs $A_k$, $B_k$, $\overline{C}_{k-1}$) | | | |
|---|---|---|---|---|---|---|
| $A_k$ | $B_k$ | $C_{k-1}$ | $\overline{C}_{k-1}$ | XOR12 | XNOR18 | $\overline{C}_k$ |
| 0 | 0 | 0 | 1 | 0 | 0 | 1 |
| 0 | 0 | 1 | 0 | 0 | 1 | 1 |
| 0 | 1 | 0 | 1 | 1 | 1 | 1 |
| 0 | 1 | 1 | 0 | 1 | 0 | 0 |
| 1 | 0 | 0 | 1 | 1 | 1 | 1 |
| 1 | 0 | 1 | 0 | 1 | 0 | 0 |
| 1 | 1 | 0 | 1 | 0 | 0 | 0 |
| 1 | 1 | 1 | 0 | 0 | 1 | 0 |

A comparison of Tables 1 and 2 reveals that the sums $S_k$, i.e. XOR10 Table 1 and XNOR18 Table 2 are equal for like values of $A_k$, $B_k$ and the true value of $C_{k-1}$ thus the circuits of FIGS. 1 and 2 perform like functions.

The FIG. 2 circuit eliminates the need for the NAND gate 14 and NOR gate 16 of the FIG. 1 circuit. Nominally in CMOS technology each of the gates is constructed with four transistors. The FIG. 2 circuit therefore saves six transistors per ADDER stage or 48 transistors for an 8 bit ADDER. In addition, the capacitive loading on the digit input connection $A_k$ and $B_k$ will nominally be reduced thereby enhancing the speed of operation of the circuit.

FIG. 3A is a single conductivity type transistor circuit analogous to the complementary transistor circuit of FIG. 2 wherein the transistor of the second (N22,N23) switches are of like conductivity type to the transistors of the third switch (N20,N21). Closure of the second and third switches is made mutually exclusive by the inclusion of the inverter circuits 28 and 29 to drive the control electrodes of transistors 23 and 22, respectively. Nominally the saving in transistors for the FIG. 3A configuration over a single conductivity transistor circuit analogous to the FIG. 1 circuit is less dramatic than the savings realized in the CMOS circuit of FIG. 2. However, if the NOR gate 30 and transistor N25 of FIG. 3B are substituted for the inverters 38,29 and the transistor N22,N23, respectively, in FIG. 3A a, nominal savings of four transistors per ADDER stage can be realized.

Note transistors N23 and N22 provide a conduction path between $V_D$ and output terminal $\overline{C}_k$ only when $A_k$ and $B_k$ are both logical zeroes. NOR gate 30 conditions transistor N25 to conduct between $V_D$ and $\overline{C}_k$ only when $A_k$ and $B_k$ are both at logical zero levels.

The circuits of FIGS. 1, 2 and 3 are designed to process positive logic signals i.e. a logic "1" being represented by a relatively positive input potential. The circuitry of FIG. 1 can be arranged to process negative logic signals by substituting an XNOR for XOR 12. The circuits of FIGS. 2 and 3 can be arranged to process negative logic signals by substituting XNOR 18 and XNOR 26 with respective XOR gates.

What is claimed is:

1. A binary ADDER stage for producing the sum of two single bit binary numbers and the complement of a single bit binary carry signal and providing the complement of a carry output signal associated with said sum, comprising:

first and second binary input terminals;

a sum output terminal;

a carry complement input and a carry complement output terminal;

an exclusive OR gate having first and second input terminals connected to the first and second binary input terminals respectively, and having an output terminal;

an exclusive NOR gate having first and second input terminals connected respectively to said carry complement input terminal and the output terminal of the exclusive OR gate;

a first transistor having a principal conduction path connected between the carry complement input and carry complement output terminals and having a control electrode connected to the output terminal of said exclusive OR gate;

first and second P-type transistors serially connected between the carry complement output terminal and a point of relatively positive supply potential and having respective control electrodes connected to the first and second binary input terminals respectively; and third and fourth N-type transistors serially connected between the carry complement output terminal and a point of relatively negative supply potential and having respective control electrodes connected to the first and second binary input terminals respectively.

* * * * *